United States Patent
Specht et al.

(10) Patent No.: US 6,196,487 B1
(45) Date of Patent: Mar. 6, 2001

(54) COUPLING DEVICE FOR TRANSMITTING TORQUE

(75) Inventors: Martin Specht, Feldafing; Andreas Knych, München, both of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/366,673

(22) Filed: Aug. 3, 1999

(30) Foreign Application Priority Data

Sep. 25, 1998 (DE) .............................................. 198 44 092

(51) Int. Cl.[7] .................................................. B60R 22/46
(52) U.S. Cl. .............................................................. 242/374
(58) Field of Search ........................... 242/374; 280/806; 297/478, 480

(56) References Cited

U.S. PATENT DOCUMENTS

| | | | |
|---|---|---|---|
| 4,618,108 | * 10/1986 | Butenop et al. | ...................... 242/374 |
| 4,750,686 | * 6/1988 | Fohl | ...................................... 242/374 |
| 5,730,384 | * 3/1998 | Fohl | ...................................... 242/374 |
| 5,749,536 | * 5/1998 | Specht et al. | ......................... 242/374 |
| 6,010,589 | * 8/2000 | Schmidt et al. | ...................... 242/374 |
| 6,105,893 | * 7/1999 | Fohl | ...................................... 242/374 |

FOREIGN PATENT DOCUMENTS 295 06 208 U    7/1995 (DE) .

* cited by examiner

*Primary Examiner*—John M. Jillions
(74) *Attorney, Agent, or Firm*—Lonnie Drayer

(57) ABSTRACT

A coupling device transmits a torque from a rotatable driving member to a driven member connected to a belt reel of a seat belt retractor for driving the belt reel in the belt winding direction. The coupling device is held in a disengaged state by a spring force in a rest position. The coupling device is mounted on a driving member and can be engaged in the driven member during rotation of the driving member as a result of its inert mass and of guide means acting between the driving member and the coupling element. In particular, tightening of the seat belt is achieved in this way.

14 Claims, 4 Drawing Sheets

COUPLING DEVICE FOR TRANSMITTING TORQUE

FIELD OF THE INVENTION

The invention relates generally to seat belt retractors and more specifically to a coupling device for transmitting torque to a spool for driving the spool.

DISCUSSION OF THE PRIOR ART

A coupling device of this type is known from DE 29506208 U1. In the known coupling device, a torque is transmitted from a driving member, which is set in rotation by a tightening drive, to a driven member, which is connected to a belt reel of a seat belt retractor, for driving the belt reel in the belt winding direction. The seat belt is thus tightened on the vehicle occupant's body. The coupling element located on the driving member in the form of a pivotal coupling pawl is kept in the disengaged state by spring force. On rotation of the driving member, the coupling element is brought into interlocking engagement with the driven member such that the torque is transmitted from the driving member via the driven member to the belt reel of the seat belt retractor.

It is an object of the invention to provide a coupling device in which the coupling element is reliably brought into the engaged position in a short time using simple aids.

According to the present invention, the inert mass of the coupling element mounted on the driving member is utilized to bring the coupling element reliably into the engaged position in which the coupling element is interlocked with the driven member using simple guide means which can be designed in the form of mutually engaging pins and guide slots and/or guide surfaces.

The coupling element is preferably moved against the spring force from the rest position into a guided position. This movement takes place as a result of the inertial force resulting from the inertia mass and acting on the coupling element. In the guided position, or in the guided state, the coupling element moves radially inwards with respect to the axis of rotation of the driven driving member until the coupling element reaches the engaged position. In the process, the coupling element can be pivoted, in particular with the region comprising an engagement member interlocking with the driven member, round a pivot axis outside the axis of rotation of the driving member, whereby the pivot axis can rotate with the driving member. In this embodiment, the engagement movement is formed by the pivoting movement which the engagement member of the pivot element performs round the pivot axis and the rotational movement which the pivot axis performs round the axis of rotation of the driving member.

The driven member can be rotationally engaged with the belt reel, and the belt reel and the driven member can be arranged coaxially. The axis of rotation of the driving member can also lie coaxially with the common axis of the driven member and the belt reel.

A path of travel preferably located on the driving member can be provided between the rest position and the guided position or the guided state of the coupling element. The path of travel can be designed in the form of a slot in which a bearing pin of the coupling element engages. The path of travel extends substantially tangentially to a circle, or over a circle, round the axis of rotation of the driving member. At the beginning of the driven rotation of the driving member, the coupling element is moved along this path of travel and brought from the rest position into the guided position as a result of its inertia mass. In the guided position the coupling element comes, with a guide means provided thereon, for example in the form of a control pin, into contact with a guide means provided on the driving member, in particular in the form of a control face or control edge which can be a lateral limit of a slot in the driving member. The desired engagement movement of the coupling element is brought about by the positioning of the bearing pin in the first slot and the guidance of the control pin along the control face or edge which extends substantially over a circle round the axis of the bearing journal. In the guided state, the coupling element which is subjected to the influence of its inert mass is supported and guided at two positions, namely at its pivot axis and by the other guide means on the driving member.

In the engaged position, the coupling element is supported on the driving member, preferably on at least two support points, such that reliable transmission of the torque to the driven member is ensured. The two support points can be substantially diametrically opposed with respect to the axis of rotation. There is preferably an interlocking fit between the coupling element and the driving member along relatively large contact faces at the support points. Apart from the reliable transmission of torque, this ensures that the high-pressure forces occurring do not deform the components forming the support points.

The coupling element is preferably designed as a two-armed lever of which the axis is formed by the pivot axis that comes into effect in the guided state of the coupling element. One support point is located on one lever arm and the other of the two support points on the other lever arm. The spring force that acts between the driving member and the coupling element and keeps the coupling element in the rest position is formed by a spring preferably designed as a tension spring. One end of the spring acts on the driving member and the other end of the spring on a lever arm, in particular on the end of the lever arm of the coupling element. The engagement member interlocking with the driven member in the engaged state is located on the other lever arm of the coupling element. The guide means are preferably located on the lever arm end or in the vicinity thereof.

When the coupling is engaged, the driving force of a tightener drive, which can be pyrotechnical, mechanical or the like in design, is transmitted from the driving member in order to tighten a seat belt wound onto the belt reel. On completion of the tightening process, the restoring force of a motive spring which is provided in the conventional manner acts in the belt winding direction on the belt reel when the seat belt webbing is relaxed. The interlocking elements, in particular teeth, which are provided on the driven member and on the engagement member of the coupling element and are mutually engaged in the engaged state, are arranged such that they are released from one another by this torque. The spring which biases the coupling element into the rest position, also acts on the coupling element and moves it, after release of the interlocking fit on the respective support faces, along the guide path into the rest position. After tightening of the seat belt, therefore, the seat belt retractor is available again as an automatic self-winding device.

DETAILED DESCRIPTION OF THE INVENTION

Figure 1:
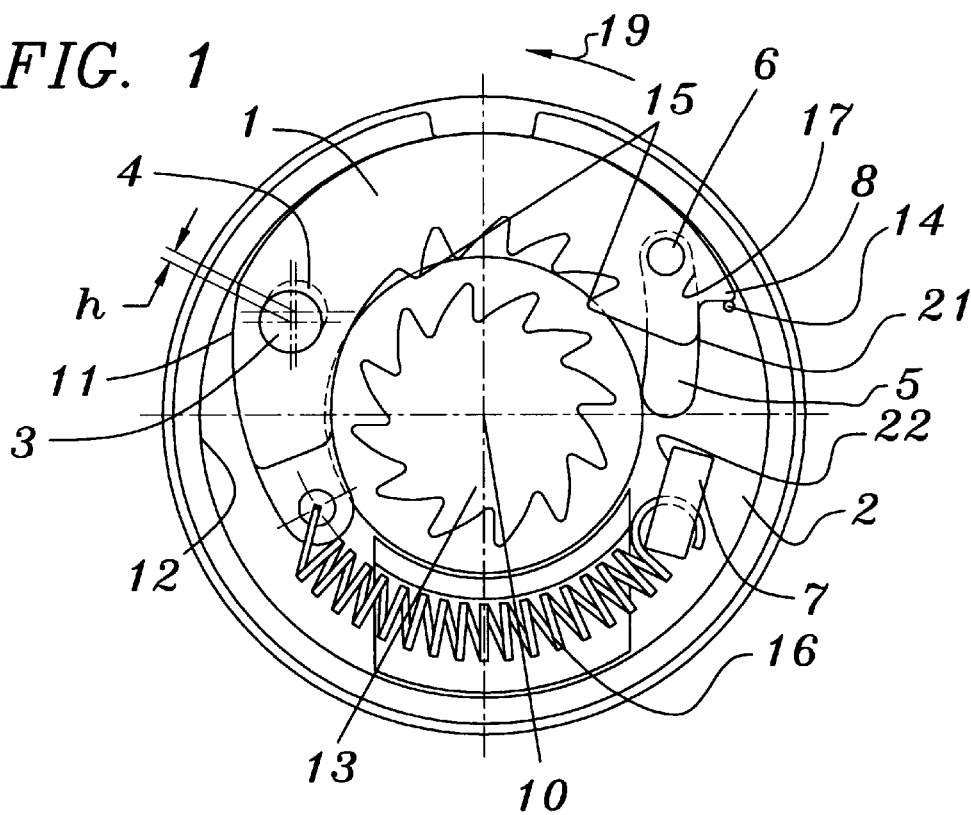
FIG. 1 shows a first embodiment in the rest position during normal operation of the belt retractor in a vehicle.
Figure 2:
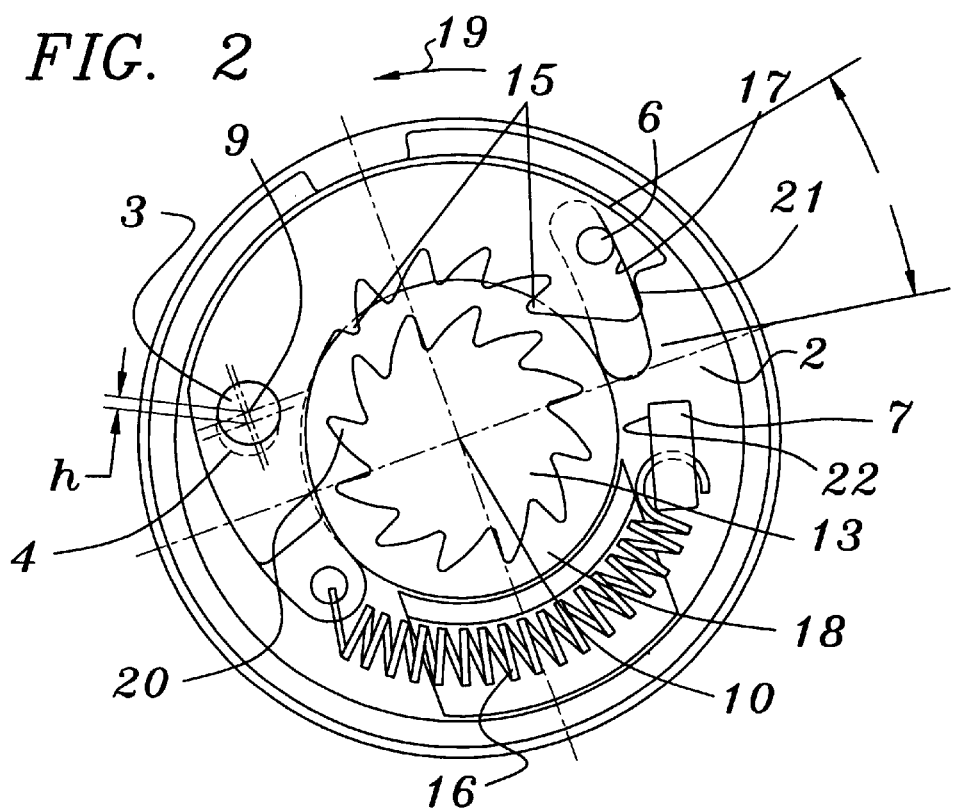
FIG. 2 shows the first embodiment after transfer from the rest position into the guided state or into the guided position.

The embodiments of a coupling illustrated in FIGS. 1 to 8 are used to transmit a torque from a rotatable driving member 2 to a driven member connected to a belt reel 18 of a seat belt retractor. In the embodiment illustrated, the driven member 13 is rotationally engaged with the belt reel 18 of the seat belt retractor. The driving member 2 is set in rotation by a tightener drive, not shown in detail, which can be, for example, a pyrotechnic tightener drive. The driving force generated by the tightener drive is transmitted via the illustrated coupling, when it is in the engaged state, to the belt reel 18. The seat belt wound onto the belt reel is wound in the belt winding direction. The belt webbing resting on the vehicle occupant's body is then tightened and the vehicle occupant is held in the vehicle seat in the retracted position.

As already mentioned, the coupling possesses the driving member 2 on the driving side. The driven member 13 that is rotationally engaged with the belt reel 18 is located on the driven side. The driven member 13 possesses teeth 20 with which the teeth of an engagement member 15 on a coupling element 1 can interlock. The coupling element is movably mounted on the driving member as will be described in detail. The coupling element 1 is held in its rest position (FIGS. 1, 5) by a spring 16 which is designed as a tension spring in the embodiment. A fixing element 14, for example in the form of a shearing pin, can act as additional holding element. The coupling adopts the position shown in FIGS. 1 and 5 during normal operation of the belt retractor. If the vehicle and the vehicle occupant are subjected to an excessive acceleration in the event of a traffic accident, the tightener drive is activated in a known manner and the driving member 2 thus set in rotation with high acceleration as the forces generated by the tightener drive have to be transmitted within a few milliseconds to the belt reel 18 in order to tighten the seat belt. The driving member 2 is rotated round its axis of rotation 10 in a direction of rotation 19 illustrated in the figures. The axis of rotation 10 extends coaxially to the axes of the belt reel 18 and the driven member 13 in the embodiment illustrated. These parts are also mounted rotatably around the axis of rotation 10. As a result of mass inertia the coupling element 1 remains in a rest position such that the fixing element (shearing pin) 14 entrained by the driving member 2 is sheared off whereby the coupling element 1 can move relative to the accelerated driving member 2 against the force of the spring 16. As a result of its inertia mass, a force of inertia against the direction of rotation 19 acts on the coupling element 1 so that a bearing journal 3 which is provided on the coupling element 1 and projects into a slot 4 of the driving member 2 travels along a path of travel h. The bearing journal 3 in the slot 4 therefore passes from one end (lower end in FIGS. 4, 5) of the slot 4 to the other end (upper end in FIGS. 2, 6) of the slot 4.

Figure 3:
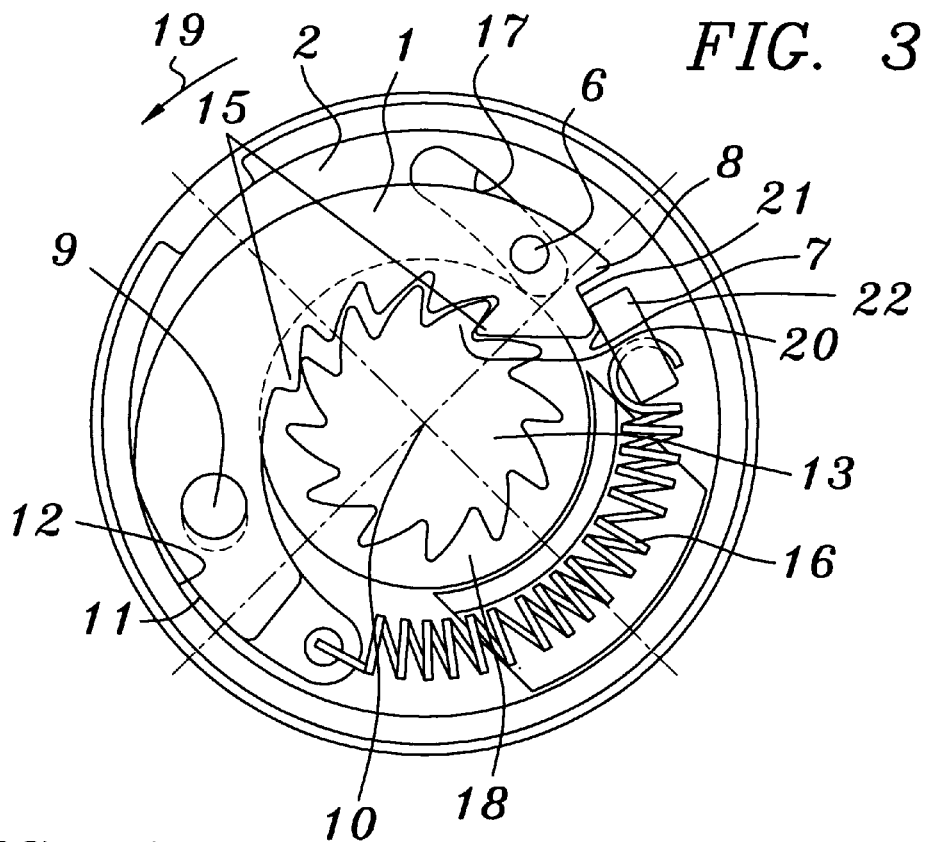
FIG. 3 shows the first embodiment in an intermediate position during the engagement process.
Figure 4:
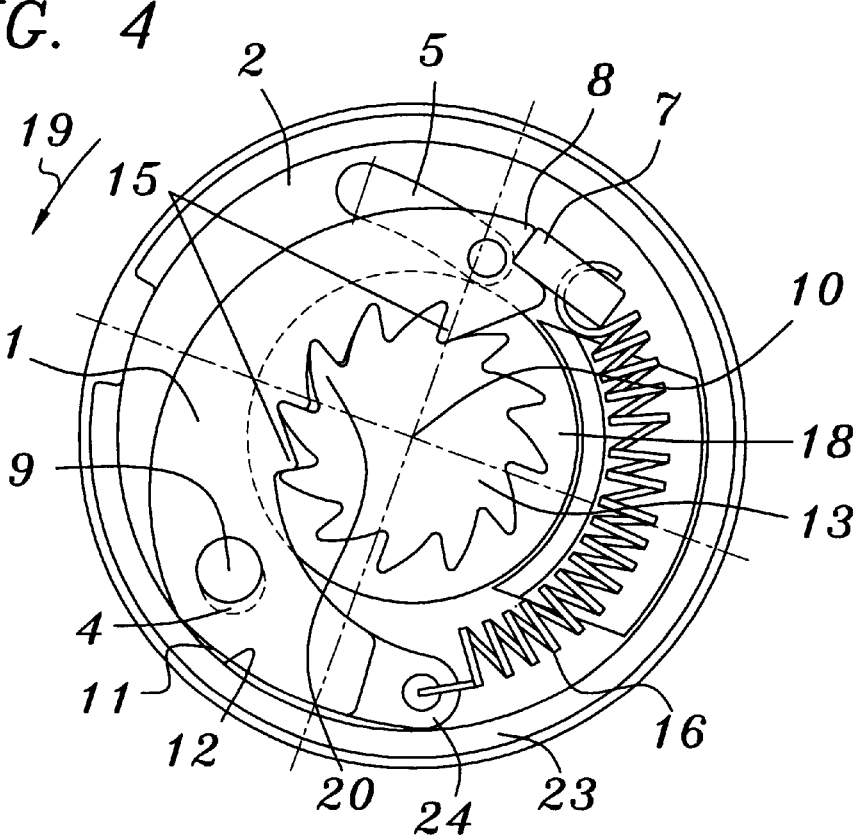
FIG. 4 shows the first embodiment in the engaged coupling position.
Figure 5:
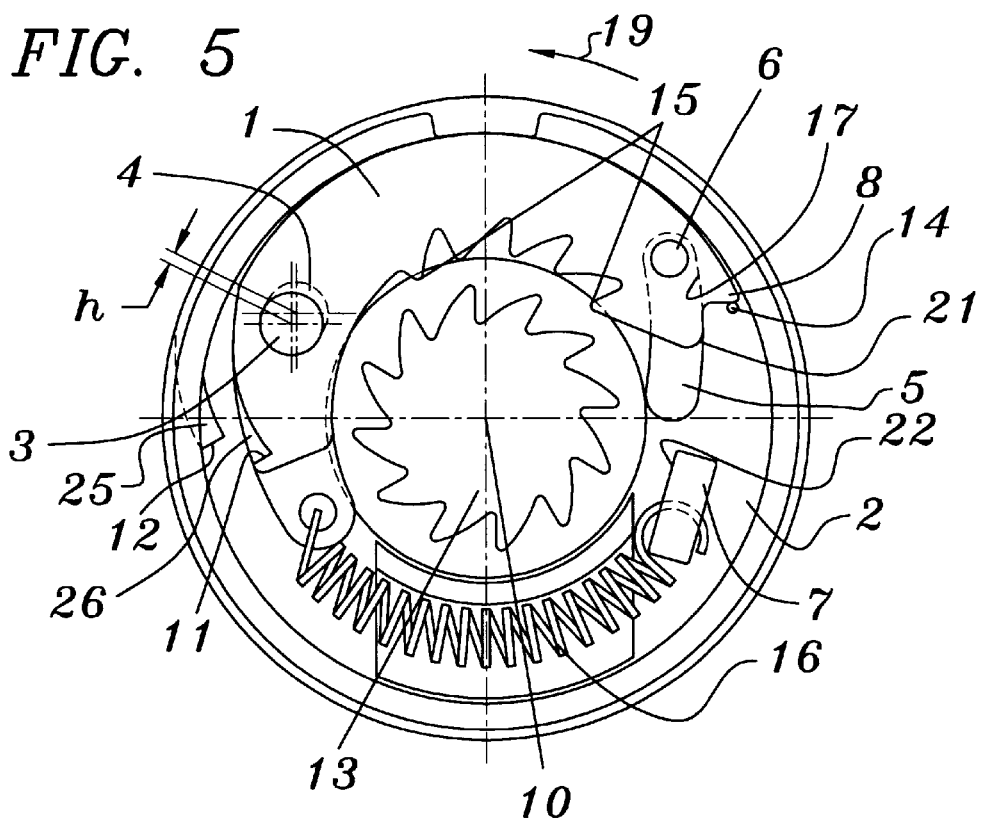
FIG. 5 shows a second embodiment in the rest position during normal operation of the belt retractor in a vehicle.
Figure 6:
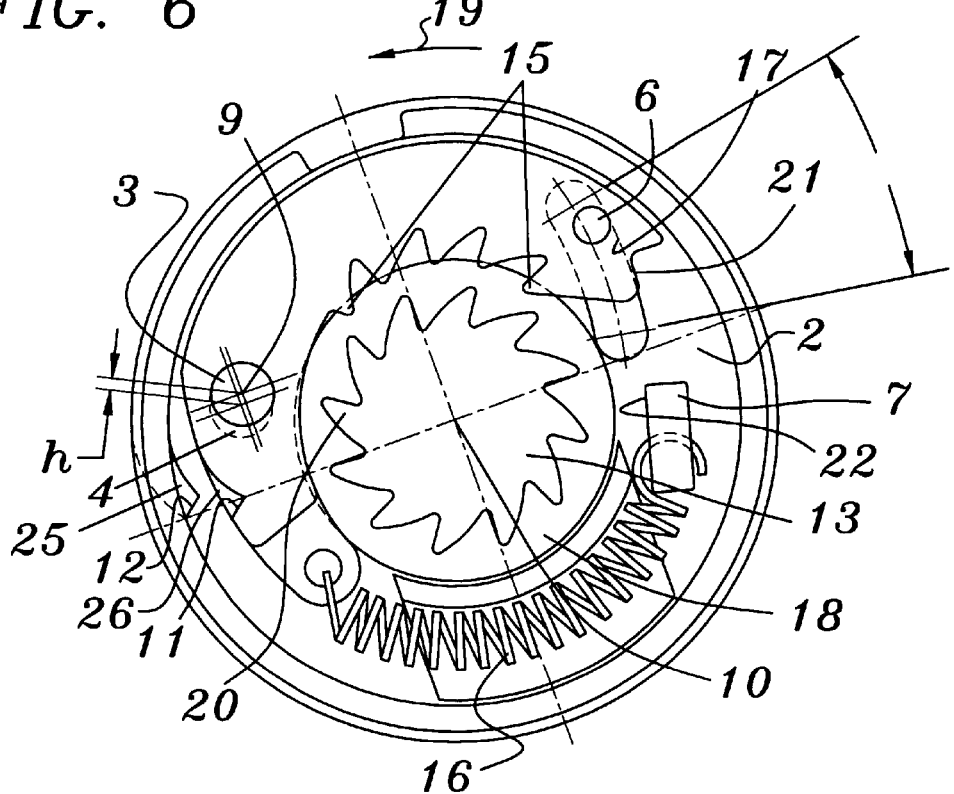
FIG. 6 shows the second embodiment after transfer from the rest position into the guided state or into the guided position.
Figure 7:
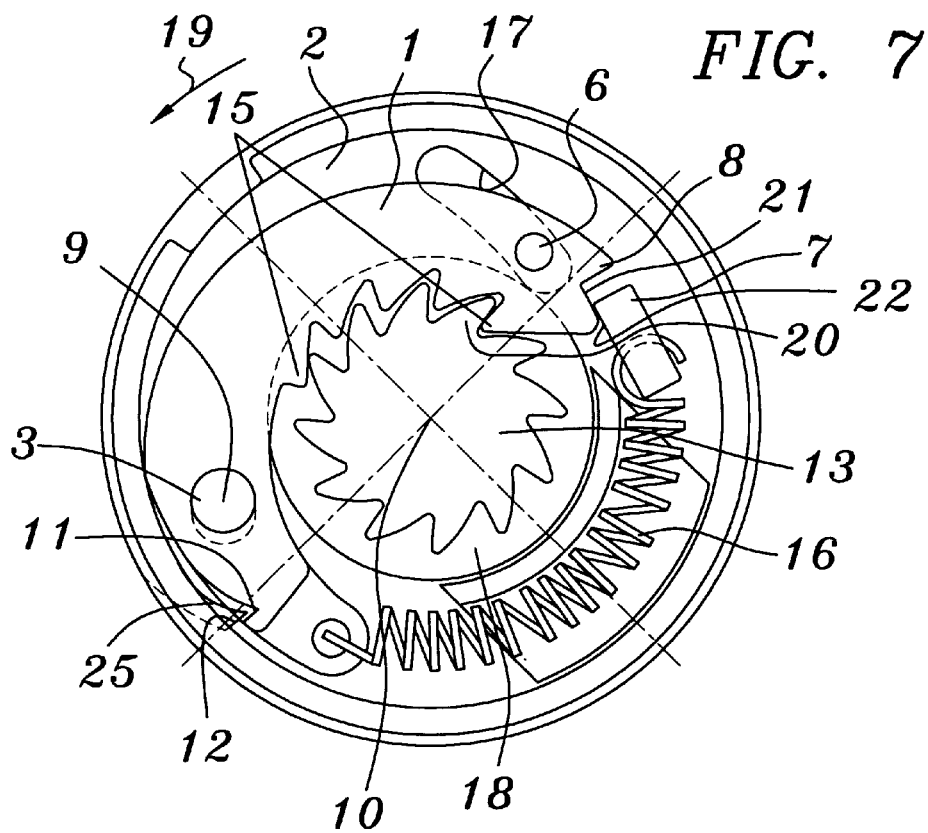
FIG. 7 shows the second embodiment in an intermediate position during the engagement process.
Figure 8:
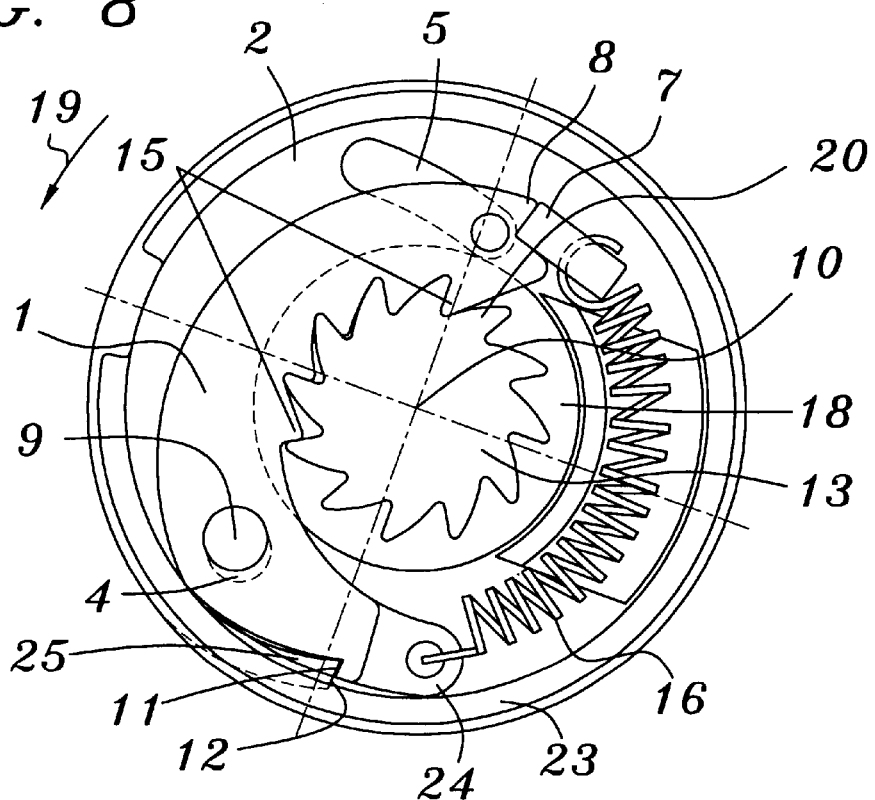
FIG. 8 shows the second embodiment in the engaged position of the coupling.

A control pin 6 which projects into a curved slot 5 of the driving member 2 is also fastened on the coupling element 1. During the travel along the path of travel h from the position shown in FIGS. 1 and 5 into the position shown in FIGS. 2 and 6, the control pin 6 is brought into contact with a control face 17 forming a lateral limiting edge of the slot 5. The control face 17 extends substantially over a circular track round a pivot axis 9 defined by the bearing journal 3 resting on the upper end of the slot 4 (FIGS. 2 to 4 and 6 to 8). During further rotation of the driving member 2 in the direction of rotation 19, the control pin 6 moves along the control face 17 until the coupling element 1 at its front end having a shaped guide face 21 comes into guiding engagement with a corresponding lateral guide face 22 on the driving member 2. The guide face 22 can be provided on an anvil 7 fastened on the driving member 2. The anvil 7 can simultaneously act as a fastening element for one end of the tension spring 16. The control pin 6 can disengage from the control face 17 (FIGS. 3, 7). During further rotation of the driving member 2, the coupling element 1 which remains substantially in its starting position as a result of the above-described inertial force, finally engages with the teeth 20 of the driven member 13, as shown in FIGS. 4 and 8. The teeth of the engagement member 15 on the coupling element 1 therefore interlock, at least with a portion of the teeth, with the teeth 20 of the driven member 13 (FIGS. 4, 8). The coupling member 1 has therefore performed a guided engagement movement along a guide path s relative to the driven member 13 and the driving member 2, defined at two points, namely the bearing journal 3 and the control pin 6 or the guide face 21, in its guided position or its guided state starting from FIG. 2 or 6 as far as FIG. 4 or 8. The coupling element 1 therefore has a two-sided bearing on the driving member 2 during its engagement movement.

In the engaged position (FIGS. 4, 8), the coupling element 1 is also supported in an interlocking manner at two support points on the driving member 2. The first support point is formed between a stop 8 at the front end of the coupling element 1 and the anvil 7. Stop faces which rest on one another and extend substantially perpendicularly to the direction of rotation 19 and the guide faces 21, 22 can be formed on the anvil 7 and on the stop 8. A pushing action is therefore exerted by the driving element 2 via the anvil 7 on the coupling element 1. This push acting round the axis of rotation 10 is transmitted via the coupling element 1 to the driven member 13 and the belt reel 18. A second support point is in also formed which is located substantially diametrically opposite to the support point embodied by the anvil 7 and stop 8 with respect to the axis of rotation 10. For this purpose, support faces 11 and 12 that are formed on the driving member 2 and on the coupling element 1 rest on one another over a large area. The support face is provided on a peripheral flange 23 of the driving member 2. The support face 11 is located on the coupling element 1. For this purpose, the coupling element 1 is designed in the manner of a two-armed lever of which the lever axis coincides with the pivot axis 9. The above-described engagement member 15 of the coupling element is formed on one lever arm and the above-mentioned support face 11 is located on the other lever arm. Deformation of the components during tightening of the belt by the high forces transmitted thereby is avoided as a result of the configuration of the two support points with which the coupling element 1 is supported on the driving member 2. The two support faces 11, 12 can extend substantially over circumferences of circles having centres located in the axis of rotation 10 in the engaged state (FIG. 4). Preferably, however, they differ from a circumference of a circle and, in order to increase the supporting action, follow a course directed toward the axis of rotation 10 to form interlocking contact faces, as is the case, for example, with the embodiment in FIGS. 5 to 8.

The load on the guide means, which guides the coupling element 1 during its engagement movement on the driving member 2, is also reduced by the described two support points on the stop 8 and on the anvil 7 on the one hand and on the support faces 11, 12 on the other hand. In particular, the loads on the bearing journal 3 and the control pin 6 are reduced.

On completion of the tightening process and with relaxed seat belt webbing, a motive spring acts on the belt reel 18 in a known manner and exerts a torque in the direction of rotation 19. The interlocking fit between the teeth 20 on the driven member 13 and the teeth on the engagement member 15 of the coupling element 1 is thus released. The release of this interlocking fit is further assisted by the restoring force of the spring 16 which acts on one end 24 of the lever arm of the coupling element 1. As a result, the coupling element 1 is retracted along the guide path s into the rest position shown in FIGS. 1 and 5. The interlocking fit at the support points between the anvil 7 and the stop 8 and the support faces 11, 12 is also released. The coupling element 1 and the guide elements, i.e. the movable bearing journal 3 and the control pin 6 are brought back into their starting position. The seat belt retractor then has a self-winding function again, as during normal operation, during which the force of the motive spring acting on the belt reel 18 is transmitted without obstruction.

In the embodiment illustrated, the coupling element 1 has a substantially semicircular curved shape that extends round the axis of rotation 10. As mentioned above, the coupling element 1 is designed as a two-armed lever that is mounted eccentrically by means of the bearing journal 3 on the driving member 2 round the pivot axis 9 and movable during its engagement movement. The driving member 2 can have a substantially pot-shaped configuration and can at the same time be designed as a coupling casing in which the coupling members are accommodated. After installation, the flange 23 of the coupling casing thus formed can be crimped with a closure cap.

In the embodiment shown in FIGS. 5 to 8, the support faces 11, 12 are created by a tooth 25 which is shaped on the flange 23, for example by punching, and projects inwardly and a tooth notch 26 formed by a recess in the coupling element 1. The support faces 11, 12 extend substantially radially or approximately radially such that load reduction on the bearing journal 3 forming the pivot axis 9 is ensured in the engaged coupling position created in FIG. 8.

It is understood that the invention is not confined to the particular construction and arrangement of parts herein illustrated and described, but embraces such modified forms as come within the scope of the following claims.

We claim:
1. A coupling device for a seat belt retractor comprising
   a) a driven member connected to a belt reel of the seat belt retractor;
   b) a rotatable driving member for transmitting torque to the driven member, wherein the torque results in the belt reel rotating in a winding direction;
   c) a coupling element having a substantially semicircular shape mounted on the driving member, the coupling element is held in a disengaged state by a spring force, the coupling element is mounted with its center of gravity outside the axis of rotation of the driving member;
   d) a guide means for guiding the coupling element to an engaged state with the driven member;
   e) two support points on the driving member that support the coupling element in the engaged position, said support points are diametrically opposed with respect to the axis of rotation; and wherein the first support point is formed between two stop faces, and the second support point formed by two support faces, one support face is provided on the driving member and the other support face is provided on the coupling element.

2. The coupling device according to claim 1, wherein the coupling element has an inertia mass and is moved by said inert mass against the spring force from the rest position into a guided position in which, during rotation of the driving member by the guide means an engagement movement directed radially inwardly with respect to the axis of rotation of the driving member is transmitted to the coupling element.

3. The coupling device according to claim 2 wherein the movement of the coupling element guided on the driving member is substantially a pivoting movement around the pivot axis, said pivot axis is defined by a bearing journal resting on an upper end of a slot.

4. The coupling device according to claim 1 wherein, the movement of the coupling element guided on the driving member is substantially a pivoting movement around the pivot axis, said pivot axis is defined by a bearing journal resting on an upper end of a slot.

5. The coupling device according claim 1 wherein the pivot axis of the coupling element is rotated around the axis of rotation of the driving member and the engagement member of the coupling element performs, relative to the driven member, an engagement movement composed of the rotational movement of the pivot axis around the axis of rotation of the driving member and the movement guided substantially radially thereto on the driving member.

6. The coupling device according to claim 1 wherein a path of travel between the rest position and the guided position is provided on the driving member for the coupling element.

7. The coupling device according to claim 6 wherein the path of travel for the coupling element is substantially curved around the driven member.

8. The coupling device according to claim 1 wherein there is an interlocking fit between the coupling element and the driving member at the support points.

9. The coupling device according to claim 1 wherein the spring force is provided by a spring which acts at one end of the spring on the driving member and the other end of the spring acts on the coupling element.

10. The coupling device according to claim 1 wherein the coupling element is moved from the engaged position into the disengaged position when the driving member is at a standstill and when a torque acts on the driven member in the belt winding direction.

11. The coupling device according to claim 1 wherein the coupling element engages with the driven member by an interlocking fit; wherein at the end of the tightening process, the coupling element is released and returns to the disengaged state.

12. The coupling device according to claim 1 wherein the coupling element is additionally held by a fixing element adapted to be sheared off, on the driving member in the rest position during normal operation.

13. The coupling device according to claim 1 wherein stop faces for reducing the load on the guide means are formed on the support points on the driving member and on the coupling element.

14. The coupling device according to claim 13 wherein the stop faces extend substantially radially to the axis of rotation of the driving member.

* * * * *